(12) United States Patent
Ito (10) Patent No.: US 12,489,336 B2
(45) Date of Patent: Dec. 2, 2025

(54) VEHICLE DRIVE DEVICE IN WHICH A POWER CABLE CAN APPROPRIATELY BE CONNECTED

(71) Applicant: AISIN CORPORATION, Aichi (JP)

(72) Inventor: Morio Ito, Kariya (JP)

(73) Assignee: AISIN CORPORATION, Kariya (JP)

( * ) Notice: Subject to any disclaimer, the term of this patent is extended or adjusted under 35 U.S.C. 154(b) by 148 days.

(21) Appl. No.: 18/271,996

(22) PCT Filed: Mar. 9, 2022

(86) PCT No.: PCT/JP2022/010190
§ 371 (c)(1),
(2) Date: Jul. 12, 2023

(87) PCT Pub. No.: WO2022/209656
PCT Pub. Date: Oct. 6, 2022

(65) Prior Publication Data
US 2024/0088743 A1      Mar. 14, 2024

(30) Foreign Application Priority Data

Mar. 31, 2021   (JP) .................................. 2021-059967

(51) Int. Cl.
*H02K 5/22*     (2006.01)
*B60K 1/00*     (2006.01)
*H02K 11/33*    (2016.01)

(52) U.S. Cl.
CPC ............... *H02K 5/225* (2013.01); *B60K 1/00* (2013.01); *H02K 11/33* (2016.01)

(58) Field of Classification Search
CPC .......... H02K 5/22; H02K 5/225; H02K 7/006; H02K 11/30; H02K 11/33
See application file for complete search history.

(56) References Cited

U.S. PATENT DOCUMENTS

| 2009/0014222 A1* | 1/2009 | Tatematsu ................ B60K 6/26 180/65.265 |
| 2009/0250275 A1* | 10/2009 | Yoshida ................ B60K 6/365 180/65.21 |
| 2023/0264554 A1* | 8/2023 | Downs ..................... H02K 7/14 180/65.6 |

FOREIGN PATENT DOCUMENTS

| EP | 1 946 955 A1 | 7/2008 |
| JP | 2001354040 A | * 12/2001 |

(Continued)

OTHER PUBLICATIONS

Kuroyanagi, Machine Translation of WO2019198830, Oct. 2019 (Year: 2019).*

(Continued)

*Primary Examiner* — Eric Johnson
(74) *Attorney, Agent, or Firm* — Oliff PLC (57) ABSTRACT

A case body has a first opening that is open along a first direction and through which an inverter device is insertable, a surrounding wall portion disposed along the first direction so as to surround the first opening, and a second opening that is formed in the surrounding wall portion and through which a power cable is insertable. A cover member is fixed to the surrounding wall portion by a plurality of fastening members disposed away from each other along an opening edge of the first opening so as to cover the first opening. A second opening width in a direction orthogonal to the first direction is smaller than an opening width of the second opening in the first direction, and a pair of the fastening members is disposed on both sides across the second opening.

7 Claims, 7 Drawing Sheets

(56) References Cited

FOREIGN PATENT DOCUMENTS

JP      2011134654 A  *  7/2011
WO      2013/069774 A1    5/2013
WO   WO-2019198830 A1 * 10/2019

OTHER PUBLICATIONS

Takenaka, Machine Translation of JP2001354040, Dec. 2001 (Year: 2001).*
Hirano, Machine Translation of JP2011134654, Jul. 2011 (Year: 2011).*
Jun. 5, 2024 Extended Search Report issued in European Patent Application No. 22779879.0.

* cited by examiner

VEHICLE DRIVE DEVICE IN WHICH A POWER CABLE CAN APPROPRIATELY BE CONNECTED

TECHNICAL FIELD

The present disclosure relates to a vehicle drive device including a rotary electric machine, an inverter device for controlling drive of the rotary electric machine, and a case.

BACKGROUND ART

WO2013/069774 discloses a vehicle drive device (motor power unit (4)) including a motor (11) serving as a driving force source of a vehicle, an inverter (12) that drives the motor (11), and a speed reducer (13) that reduces the speed of rotation of the motor (11) and transmits the rotation to wheels (9) (reference numerals in parentheses in the background art are those in the reference document). The motor power unit (4) includes a case obtained by integrating a motor case (15) that houses the motor (11), an inverter housing case (16) that houses the inverter (12), and a speed reducer case (17) that houses the speed reducer (13). The inverter (12) and the motor (11) are electrically connected in this integrated case.

The motor case (15) and the inverter housing case (16) have a detachable end cover (18) serving as a common cover member. The inverter housing case (16) has a detachable top cover (19) that covers the top of the inverter housing case (16) as a cover member independent of the end cover (18). The inverter case (16) is formed so as to have a rectangular parallelepiped housing space. The inverter housing case (16) has three side walls (16a) integrally formed upright above the outer peripheral surface of the body of the cylindrical motor case (15) so as to extend from the motor case (15) side. A shelf-shaped mount (24) on which the inverter (12) is placed is disposed below the inner peripheral side surrounded by the side walls (16a). The end cover (18) also has an extension portion (18a) integrally formed above the motor case (15) so as to extend from the motor case (15) side in a state in which the end cover (18) is attached to the motor case (15). The extension portion (18a) forms one remaining side wall of the inverter housing case (16) having the rectangular parallelepiped housing space.

When the inverter (12) is placed on the mount (24) and the end cover (18) is attached, the inverter housing case (16) is covered from the bottom and sides. Further, the top cover (18) is brought into contact with and fixed by fastening to the upper ends of the side walls of the inverter housing case (16) (the upper ends of the three side walls (16a) and the upper end of the extension portion (18a) of the end cover (18)). Thus, the inverter (12) is closed and housed in the inverter housing case (16). As described above, the case of the motor power unit (4) is the case obtained by integrating the motor case (15), the inverter housing case (16), and the speed reducer case (17). Therefore, the motor (11) and the inverter (12) are electrically connected in the case as described above.

RELATED ART DOCUMENTS

Patent Documents

Patent Document 1: WO2013/069774

SUMMARY OF THE DISCLOSURE

Problem to be Solved by the Disclosure

The inverter (12) drives the motor (11) by converting direct current power supplied from a direct current power source (lithium-ion battery (2)) via a power cable into alternating current power. The inverter (1) charges the direct current power source via the power cable by converting alternating current power generated by the motor (11) by kinetic energy generated by rotation of the wheels (9) into direct current power. In general, the voltage of the direct current power source for driving the motor (11) serving as the driving force source of the vehicle is a high voltage of several tens to several hundreds of volts, and the supplied current is also a large current of several amperes to several tens of amperes. Therefore, the power cable is generally thick and heavy.

The case of the motor power unit (4) illustrated in WO2013/069774 is the case obtained by integrating the motor case (15), the inverter housing case (16), and the speed reducer case (17). Therefore, the motor (11) and the inverter (12) are electrically connected in the case as described above. However, the direct current power source (lithium-ion battery (2)) is provided outside the motor power unit (4), and the inverter (12) and the direct current power source are connected by the power cable as described above. For this connection, an opening is often formed in the side wall (16a) or the extension portion (18a) of the end cover (18) that corresponds to the side wall of the inverter housing case (16).

The vehicle drive device vibrates due to its drive or traveling of the vehicle. When vibration occurs, a relatively large force is applied to a heavy object due to an inertial force. The power cable is mechanically connected to the case, specifically the inverter housing case (16), and electrically connected to the inverter (12). If the rigidity of the case or the connection portion between the case and the power cable is insufficient, for example, the opening formed in the side wall of the inverter housing case (16) (side wall (16a) or extension portion (18a)) may be deformed. The deformation of the opening also affects the side walls of the inverter housing case (16). For example, a lift may occur at a portion where the side walls of the inverter housing case (16) and the top cover (18) come into contact with each other. That is, the closing performance of the inverter housing case (16) may be impaired.

In view of the above background, there is a demand to provide a vehicle drive device in which a power cable can appropriately be connected while securing the rigidity of a case that houses an inverter so as not to impair the closing performance of the case.

Means for Solving the Problem

In view of the above, a vehicle drive device includes a rotary electric machine, an inverter device that controls drive of the rotary electric machine, and a case. The inverter device includes power connection terminals connected to a direct current power source. The case includes a case body and a cover member joined to the case body. The case body is integrally formed so as to form a first housing chamber that houses the rotary electric machine and a second housing chamber that houses the inverter device. The case body has a first opening that is open from the second housing chamber toward an outside of the case along a predetermined first direction and through which the inverter device is insertable.

The case body further has a surrounding wall portion disposed along the first direction so as to surround the first opening, and a second opening that is formed in the surrounding wall portion and through which a power cable electrically connecting the direct current power source and the power connection terminals is inserted. The cover member is fixed to the surrounding wall portion by a plurality of fastening members disposed away from each other along an opening edge of the first opening so as to cover the first opening. The power connection terminals include a cathode connection terminal connected to a cathode of the direct current power source, and an anode connection terminal connected to an anode of the direct current power source. The cathode connection terminal and the anode connection terminal are juxtaposed along the first direction. Assuming that a second direction is a direction in which the second opening is open, in a second-direction view along the second direction, a second opening width that is an opening width of the second opening in a direction orthogonal to the first direction is smaller than a first opening width that is an opening width of the second opening in the first direction, and a pair of the fastening members is disposed on both sides across the second opening.

When the second opening through which the power cable is inserted is formed in the surrounding wall portion that surrounds the first opening through which the inverter device can be inserted, the second opening may be a factor of a decrease in the rigidity of the surrounding wall portion. For example, when the opening edge of the first opening is deformed due to insufficient rigidity of the surrounding wall portion, the cover member disposed so as to cover the first opening may be lifted from the first opening to create a gap. According to this configuration, even when the second opening is formed, the deformation of the opening edge of the first opening can easily be suppressed because the second opening width of the second opening is smaller than the first opening width. Since the pair among the plurality of fastening members disposed along the opening edge of the first opening is disposed on respective sides of the second opening across the second opening, the cover member is fixed by fastening to the surrounding wall portion near the second opening. Therefore, the deformation of the opening edge of the first opening due to the second opening can be suppressed easily, and the lift of the cover member from the opening edge of the first opening can also be suppressed appropriately. As described above, according to this configuration, it is possible to provide the vehicle drive device in which the power cable can appropriately be connected while securing the rigidity of the case that houses the inverter so as not to impair the closing performance of the case.

Further features and advantages of the vehicle drive device will become apparent from the following description of an exemplary and non-limiting embodiment that will be given with reference to the drawings.

MODES FOR CARRYING OUT THE DISCLOSURE

Hereinafter, an embodiment of the present disclosure will be described with reference to the drawings. As shown in a skeleton diagram of FIG. 3, an axial sectional view of FIG. 4, and the like, a vehicle drive device 100 includes a rotary electric machine MG, an inverter device INV that controls drive of the rotary electric machine MG, and a case 1. As shown in an external side view of FIG. 1, an external perspective view of FIG. 2, and the like, the case 1 includes a case body 2 and a cover member (first axial cover 11, second axial cover 12, and top cover 13 (cover member)) joined to the case body 2. The case body 2 is integrally formed so as to form a first housing chamber 5 that houses at least the rotary electric machine MG and a second housing chamber 3 that houses the inverter device INV. The term "integrally formed" refers to, for example, a unitary member made of a common material as a single die casting. The case body 2 includes a partition wall portion 4 that separates the first housing chamber 5 and the second housing chamber 3 from each other. That is, the case 1 is integrally formed so as to include the first housing chamber 5 that houses at least the rotary electric machine MG and the second housing chamber 3 that houses the inverter device INV and is separated from the first housing chamber 5 by the partition wall portion 4.

The vehicle drive device 100 includes the rotary electric machine MG disposed on a first axis A1, a pair of output members OUT disposed on a second axis A2 and drivingly connected to a pair of wheels W, a transmission mechanism TM that transmits a driving force between the rotary electric machine MG and the output members OUT, and the inverter device INV that controls the drive of the rotary electric machine MG. The rotary electric machine MG is a driving force source for the pair of wheels W. The transmission mechanism TM includes a counter gear mechanism CG and a differential gear mechanism DF (output differential gear device). The differential gear mechanism DF distributes the driving force transmitted from the rotary electric machine MG to the pair of wheels W. Although details will be described later, a pair of side gears (first side gear S1 and second side gear S2) of the differential gear mechanism DF corresponds to the pair of output members OUT. In the present embodiment, in the vehicle drive device 100, the counter gear mechanism CG and the differential gear mechanism DF are provided as the transmission mechanism TM (power transmission device) in this order from the rotary electric machine MG side in a power transmission path connecting the rotary electric machine MG serving as a power generation device and the wheels W.

The axis of the rotary electric machine MG (first axis A1) and the axis of the differential gear mechanism DF (second axis A2) are axes different from and parallel to each other. The axis of the counter gear mechanism CG (third axis A3) is parallel to the first axis A1 and the second axis A2. That is, the first axis A1, the second axis A2, and the third axis A3 are imaginary axes different from each other, and are parallel to each other.

In the following description, a direction parallel to the axes (A1 to A3) will be referred to as "axial direction L" of the vehicle drive device 100. One side in the axial direction L (in the present embodiment, a side where the rotary electric machine MG is disposed with respect to the differential gear mechanism DF: see FIGS. 3, 4, etc.) will be referred to as "first axial side L1", and the opposite side will be referred to as "second axial side L2". A direction orthogonal to each of the first axis A1, the second axis A2, and the third axis A3 will be referred to as "radial direction R" with respect to each axis. When it is not necessary to distinguish the axis to be used as a reference, or when the axis to be used as a reference is clear, the direction may be simply referred to as "radial direction R". A direction along the vertical direction when the vehicle drive device 100 is attached to the vehicle will be referred to as "up-down direction V". In the present embodiment, a first up-down side V1 that is one side in the up-down direction V is an upper side, and a second up-down side V2 that is the other side in the up-down direction V is a lower side. When the vehicle drive device 100 is attached to the vehicle in parallel to a horizontal plane, one direction of the radial direction R agrees with the up-down direction V. A direction orthogonal to the axial direction L and the up-down direction V will be referred to as "width direction H". One side in the width direction H will be referred to as "first widthwise side H1", and the other side in the width direction H will be referred to as "second widthwise side H2". As with the up-down direction V, one direction of the radial direction R also agrees with the width direction H. In the following description, terms related to the direction, the position, and the like of each member represent concepts that include a state in which there is a difference due to an error permissible in manufacturing. The direction of each member represents a direction of the member when mounted on the vehicle drive device 100. In the present embodiment, the up-down direction V corresponds to a first direction, and the axial direction L corresponds to a second direction.

The first housing chamber 5 formed in the case 1 includes a peripheral wall portion 29 formed so as to surround the rotary electric machine MG, the counter gear mechanism CG, and the differential gear mechanism DF. The first housing chamber 5 in the case 1 is surrounded by the peripheral wall portion 29 in the up-down direction V and the width direction H, and is open on both sides in the axial direction L. The opening of the first housing chamber 5 on the first axial side L1 will be referred to as "first axial opening 21", and the opening of the first housing chamber 5 on the second axial side L2 will be referred to as "second axial opening 22". The first axial opening 21 is closed by the first axial cover 11 joined to the end of the peripheral wall portion 29 on the first axial side L1. The second axial opening 22 is closed by the second axial cover 12 joined to the end of the peripheral wall portion 29 on the second axial side L2. That is, the first housing chamber 5 is formed as a space surrounded by the peripheral wall portion 29, the first axial cover 11, and the second axial cover 12.

Figure 2:
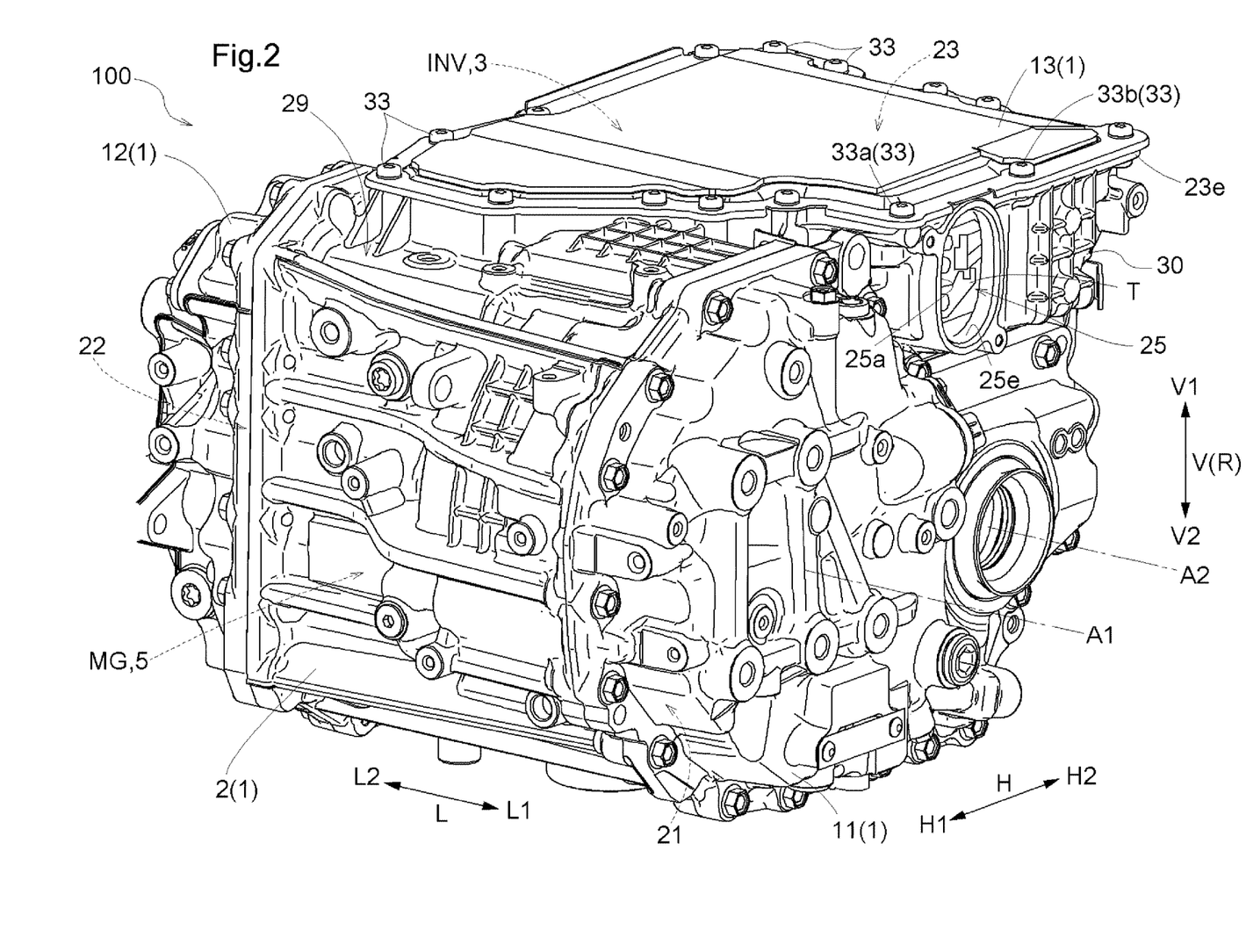
FIG. 2 is an external perspective view of the vehicle drive device.
Figure 3:
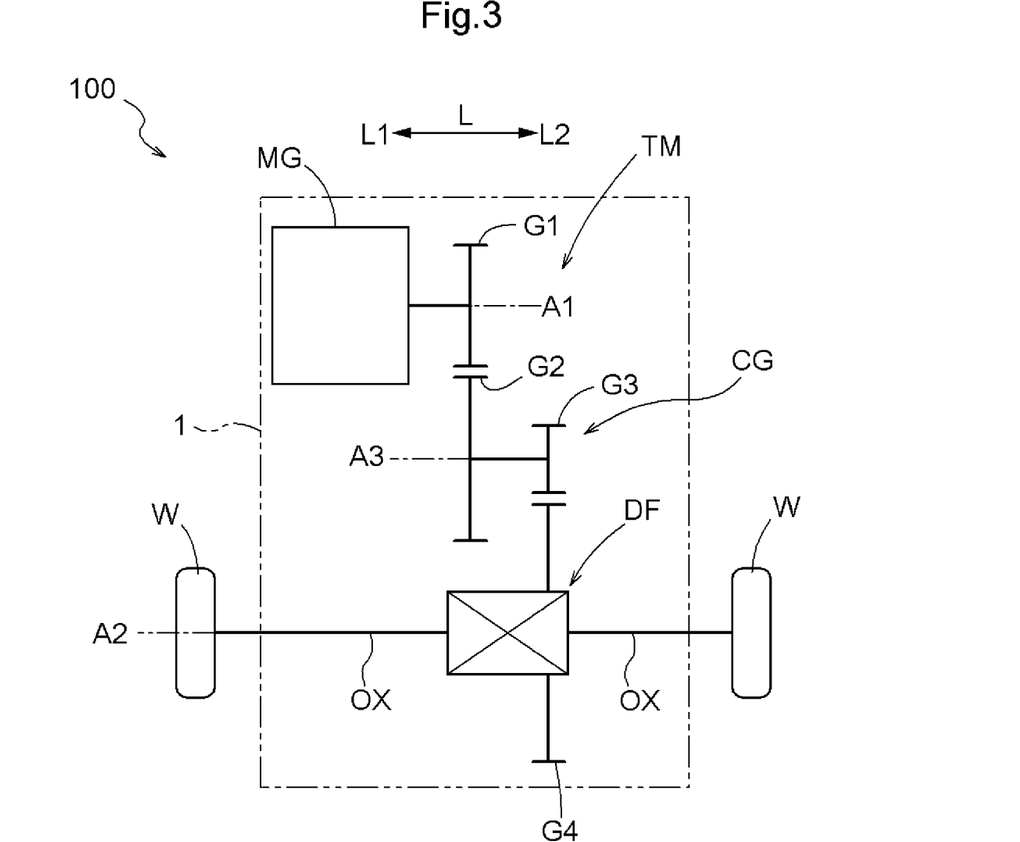
FIG. 3 is a skeleton diagram of the vehicle drive device.

A part of the peripheral wall portion 29 functions as the partition wall portion 4 that separates the first housing chamber 5 and the second housing chamber 3 from each other. A surrounding wall portion 30 extending along the up-down direction V is formed from the peripheral wall portion 29. The surrounding wall portion 30 surrounds the inverter device INV in a direction orthogonal to the up-down direction V to form the second housing chamber 3. The end of the surrounding wall portion 30 on the first up-down side V1 (upper side) is open, and an opening (up-down opening (first opening 23)) that is open from the second housing chamber 3 toward the outside of the case 1 is formed. The inverter device INV is housed in the second housing chamber 3 through the first opening 23. That is, the case body 2 has the first opening 23 that is open from the second housing chamber 3 toward the outside of the case 1 along the predetermined first direction (up-down direction V) and through which the inverter device INV can be inserted. The top cover 13 (cover member) is disposed so as to cover the first opening 23, and the first opening 23 is closed by the top cover 13 joined to the end of the surrounding wall portion 30. As shown in FIG. 2, the top cover 13 is fixed to the surrounding wall portion 30 by a plurality of fastening members 33 disposed away from each other along a first opening edge 23e that is an opening edge of the first opening 23. That is, the second housing chamber 3 is formed as a space surrounded by the partition wall portion 4 (peripheral wall portion 29), the surrounding wall portion 30, and the top cover 13.

In the present embodiment, the top cover 13 has a flat plate portion. The first opening edge 23e is positioned on one plane, and the flat plate portion of the top cover 13 is also positioned on one plane. The first opening 23 can be closed by the top cover 13 by bringing the flat plate portion of the top cover 13 into contact with the first opening edge 23e. Thus, when the top cover 13 has the flat plate portion, the first opening edge 23e of the first opening 23 and the top cover 13 are easily brought into contact with each other and fastened by the fastening members 33. If the first opening 23 (first opening edge 23e) is easily deformed, the top cover 13 may be lifted from the first opening edge 23e. Although details will be described later, the present embodiment provides a structure in which the first opening edge 23e and the top cover 13 can be fastened easily and the lift of the top cover 13 can be suppressed appropriately.

The rotary electric machine MG is a rotary electric machine (motor/generator) that operates by multi-phase alternating current (e.g., three-phase alternating current), and can function as both an electric motor and a generator. As will be described later with reference to FIG. 5, the rotary electric machine MG receives electric power supplied from a high-voltage battery BH (direct current power source ("high-voltage direct current power source" when distinguished from a low-voltage battery BL described later)) to perform power running, or supplies (regenerates) electric power generated by the inertial force of the vehicle to the high-voltage battery BH.

Figure 4:
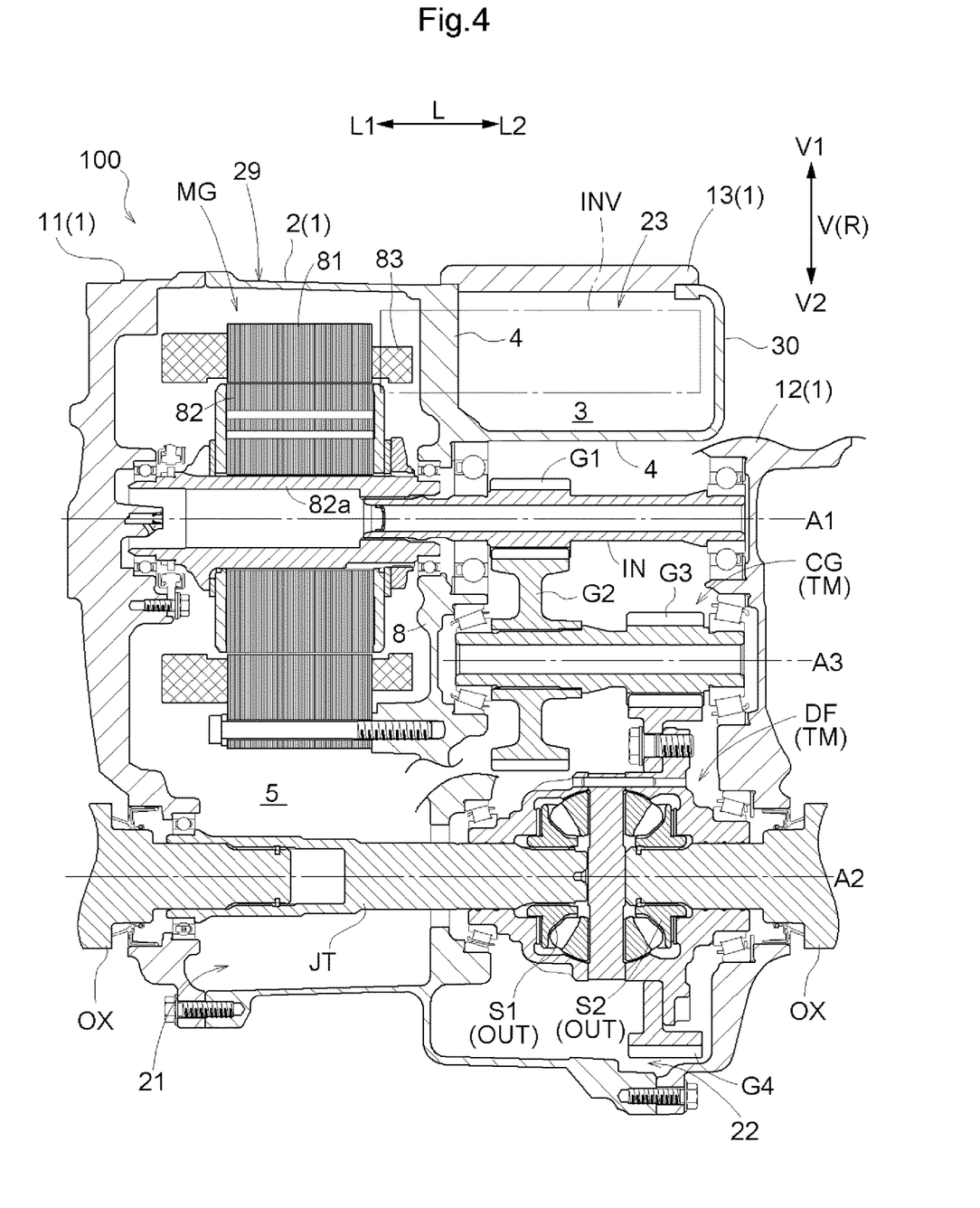
FIG. 4 is an axial sectional view of the vehicle drive device.
Figure 5:
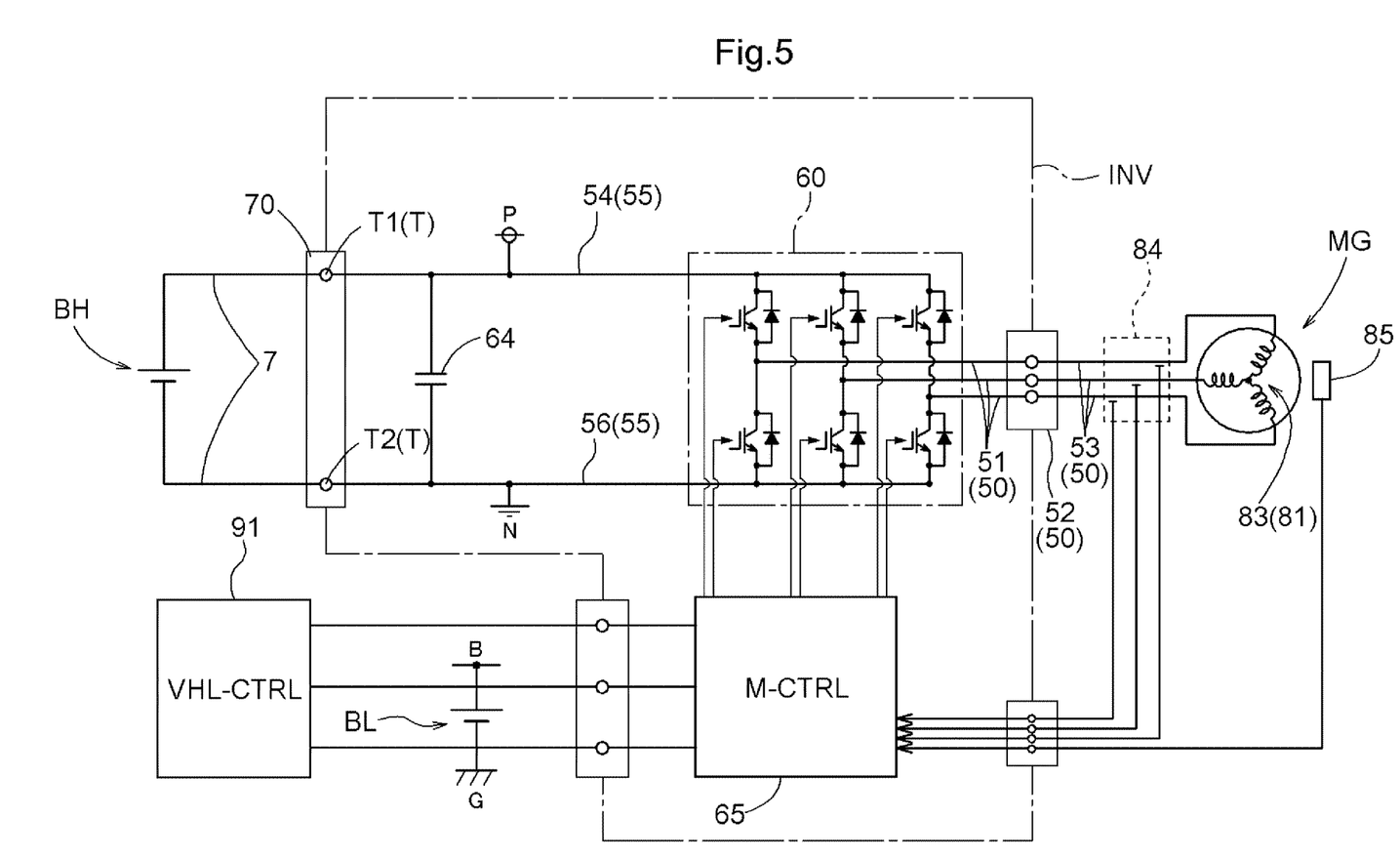
FIG. 5 is a schematic circuit block diagram of an electric system for driving a rotary electric machine.

As shown in FIGS. 4 and 5, the rotary electric machine MG includes a stator 81 fixed to the case 1 or the like, and a rotor 82 rotatably supported on a radially inner side of the stator 81. The stator 81 includes a stator core and stator coils 83 wound around the stator core, and the rotor 82 includes a rotor core and permanent magnets disposed in the rotor core. The rotor 82 of the rotary electric machine MG is drivingly connected to an input gear G1 (see FIGS. 3 and 4) via a rotor shaft 82a and an input member IN.

The input gear G1 is drivingly connected to the counter gear mechanism CG. In the present embodiment, the counter gear mechanism CG includes two gears connected by a shaft member (first counter gear G2 and second counter gear G3). The first counter gear G2 meshes with the input gear G1, and the second counter gear G3 meshes with a differential input gear G4 of the differential gear mechanism DF. The differential gear mechanism DF is drivingly connected to the wheels W via output shafts OX. The differential gear mechanism DF includes a plurality of bevel gears meshing with each other. In the present embodiment, the first side gear S1 on the first axial side L1 is connected to one output shaft OX via a connecting shaft JT, and the second side gear S2 on the second axial side L2 is connected to the other output shaft OX. Rotation and torque that are input to the differential input gear G4 are distributed and transmitted to the two output shafts OX (that is, the two wheels W) via the first side gear S1 and the second side gear. Thus, the vehicle drive device 100 can transmit the torque of the rotary electric machine MG to the wheels W to cause the vehicle to travel.

As shown in FIG. 5, the drive of the rotary electric machine MG is controlled by the inverter device INV. The inverter device INV includes an inverter circuit 60 that converts electric power between direct current power and multi-phase alternating current power. The present embodiment exemplifies the inverter circuit 60 connected to the alternating-current rotary electric machine MG and the high-voltage battery BH to convert electric power between direct current and multi-phase alternating current (in this case, three phases that are U phase, V phase, and W phase). The inverter circuit 60 includes a plurality of switching elements, and is connected to the high-voltage battery BH and the alternating-current rotary electric machine MG to convert electric power between direct current and multi-phase alternating current (in this case, three-phase alternating current). The high-voltage battery BH is a secondary battery (battery) such as a nickel-metal hydride battery or a lithium-ion battery, or an electric double layer capacitor. When the rotary electric machine MG is the driving force source of the vehicle, the high-voltage battery BH is a direct current power source having a large voltage and a large capacity, and the rated power source voltage is, for example, 200 to 400 volts. Although details will be described later, the high-voltage battery BH and the inverter device INV are electrically connected by a power cable 7.

The inverter circuit 60 includes, on its direct current side, a direct-current link capacitor 64 (smoothing capacitor) for smoothing a voltage between a cathode power line P and an anode power line N on the direct current side of the inverter circuit 60 (direct-current link voltage). The inverter circuit 60 includes a plurality of (in this case, three) arms for single-phase alternating currents, each structured by a series circuit of an upper switching element and a lower switching element. It is preferable that a power semiconductor element capable of operating at a high frequency, such as an insulated gate bipolar transistor (IGBT), a power metal oxide semiconductor field effect transistor (MOSFET), a silicon carbide-metal oxide semiconductor FET (SiC-MOSFET), a SiC-static induction transistor (SiC-SIT), and a gallium nitride-MOSFET (GaN-MOSFET) be applied to the switching elements. As shown in FIG. 5, the present embodiment exemplifies a form in which the IGBT is used as each switching element. In the present embodiment, a switching element module is structured such that the inverter circuit 60, including freewheeling diodes as well, is integrated into one power module.

As shown in FIG. 5, the inverter circuit 60 is controlled by an inverter control device 65 (M-CTRL). The inverter control device 65 is constructed with a logic circuit such as a microcomputer as a core member. The inverter control device 65 performs, based on a target torque of the rotary electric machine MG, current feedback control using a vector control method, and controls the rotary electric machine MG via the inverter circuit 60. The target torque of the rotary electric machine MG is, for example, provided as a request signal from other control devices such as a vehicle control device 91 (VCL-CTRL) that is one of the higher-order control devices in the vehicle. An actual current flowing through the stator coil 83 of each phase of the rotary electric machine MG is detected by a current sensor 84. The magnetic pole position of the rotor of the rotary electric machine MG at each time point is detected by a rotation sensor 85 such as a resolver.

The inverter control device 65 performs the current feedback control using the detection results from the current sensor 84 and the rotation sensor 85. The inverter control device 65 includes various functional units for the current feedback control, and each of the functional units is implemented by cooperation between hardware such as a microcomputer and software (program). Since the current feedback control is known, detailed description thereof will be omitted herein.

In the vehicle control device 91 and the inverter control device 65, the operating voltage of the core microcomputer or the like is, for example, 5 volts or 3.3 volts. Therefore, the vehicle control device 91 and the inverter control device 65 are low-voltage circuits that operate on electric power supplied from the low-voltage battery BL (low-voltage direct current power source) with a lower voltage (e.g., 12 to 24 volts) than that of the high-voltage battery BH. Therefore, the inverter control device 65 includes a drive circuit that increases the driving capacity (e.g., capacity to operate a subsequent circuit, such as a voltage amplitude and an output current) of a switching control signal for each switching element (gate drive signal in the case of an IGBT) and relays the switching control signal. A control terminal of each switching element constituting the inverter circuit 60 is connected to the core microcomputer or the like of the inverter control device 65 via the drive circuit, and switching control is performed for each switching element. The inverter control device 65 is structured by mounting circuit components on one or more substrates.

The inverter device INV is structured as a unit including the inverter control device 65, the direct-current link capacitor 64, and the inverter circuit 60 (power module) described above. The inverter device INV as a unit is disposed in the second housing chamber 3 inside the case 1 and fixed to the case 1 with fastening members such as bolts.

As shown in FIG. 5, the inverter device INV and the stator coils 83 of the rotary electric machine MG are electrically connected by alternating-current busbars 50. The alternating-current busbars 50 include the inverter-side alternating-current busbars 51, the alternating-current busbar connectors 52, and the rotary electric machine-side alternating-current busbars 53. The alternating-current busbar connectors 52 are disposed between the first housing chamber 5 and the second housing chamber 3 through the partition wall portion 4. One end of the alternating-current busbar connector 52 and the inverter-side alternating-current busbar 51 are electrically connected inside the second housing chamber 3. The other end of the alternating-current busbar connector 52 and the rotary electric machine-side alternating-current busbar 53 are electrically connected inside the first housing chamber 5.

As described above, the high-voltage battery BH and the inverter device INV are electrically connected by the power cable 7. A power connector 70 is disposed at the tip of the power cable 7 and attached to the case 1 (see FIGS. 6, 8, etc.). The power connector 70 includes power terminals (first power terminal 71 and second power terminal 72) electrically connected to the power cable 7. The inverter device INV includes power connection terminals T connected to the high-voltage battery BH. The power connection terminals T are provided integrally with direct-current busbars 55 (cathode busbar 54 and anode busbar 56: see FIG. 5) of the inverter device INV or provided as separate members electrically connected to the direct-current busbars 55. By electrically connecting the power terminals (first power terminal 71 and second power terminal 72) of the power connector 70 and the power connection terminals T (first connection terminal T1 and second connection terminal T2), the high-voltage battery BH and the inverter device INV (inverter circuit 60) are electrically connected.

Figure 1:
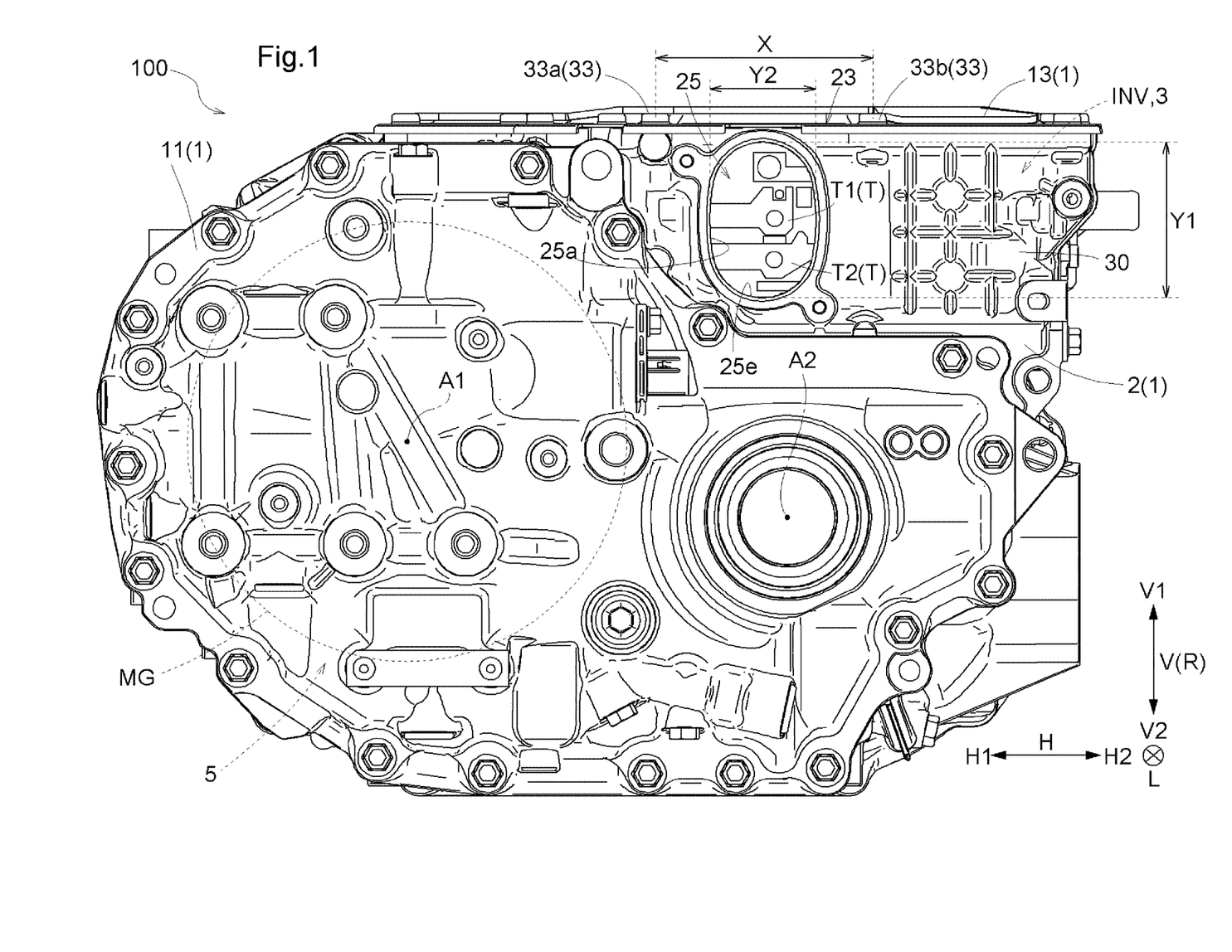
FIG. 1 is an external side view of a vehicle drive device in an axial view.
Figure 7:
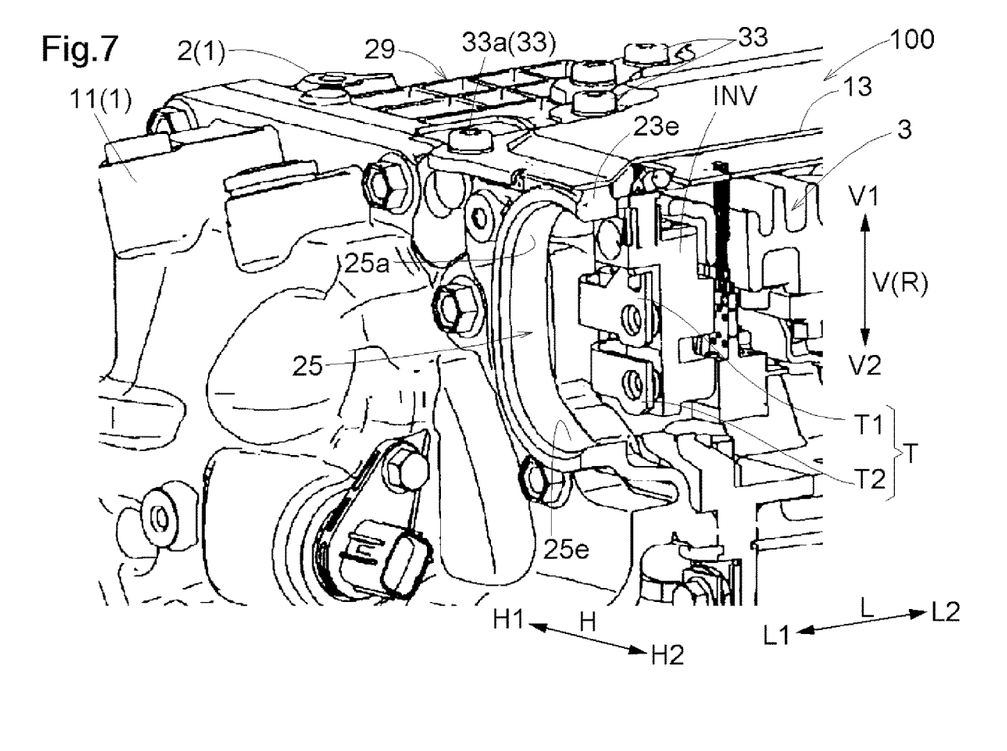
FIG. 7 is a sectional perspective view of the vicinity of a power connection opening.

As shown in FIGS. 1 and 2, the case body 2 has the surrounding wall portion disposed along the up-down direction V (first direction) so as to surround the first opening 23, and a power connection opening (second opening 25) that is formed in the surrounding wall portion 30 and through which the power cable 7 electrically connecting the high-voltage battery BH and the power connection terminals T is inserted. As shown in FIGS. 1, 7, and the like, the power connection terminals T include a cathode connection terminal connected to a cathode of the high-voltage battery BH, and an anode connection terminal connected to an anode of the high-voltage battery BH. For example, when the first connection terminal T1 is the anode connection terminal, the second connection terminal T2 is the cathode connection terminal. When the first connection terminal T1 is the cathode connection terminal, the second connection terminal T2 is the anode connection terminal. The cathode connection terminal and the anode connection terminal are juxtaposed along the up-down direction V. That is, the first connection terminal T1 and the second connection terminal T2 are juxtaposed along the up-down direction V.

The power connection terminals T and the power terminals of the power connector 70 are connected by, for example, terminal connection members 73 as described later. In a state in which the inverter device INV is inserted into the second housing chamber 3 through the first opening 23 and at least disposed in the second housing chamber 3, preferably further fixed in the second housing chamber 3, the power connector 70 is inserted into the second housing chamber 3 through the second opening 25, and the power connection terminals T and the power terminals of the power connector 70 are connected (the top cover 13 need not be joined, or it is preferable not to join the top cover 13). Therefore, the first connection terminal T1 and the second connection terminal T2 juxtaposed along the up-down direction V are disposed at positions where they are visible from the outside of the case 1 in an axial view along the axial direction L as shown in FIG. 1. In this example, the second opening 25 is provided in the surrounding wall portion 30. The second opening 25 has a shape elongated in the up-down direction V (first direction) in the axial view. In other words, in the axial view, a second opening width Y2 that is an opening width of the second opening 25 in a direction orthogonal to the up-down direction V (width direction H: direction orthogonal to the up-down direction V (first direction) and the axial direction L (second direction)) is smaller than a first opening width Y1 that is an opening width of the second opening 25 in the up-down direction V.

When the second opening 25 through which the power cable 7 is inserted is formed in the surrounding wall portion 30 that surrounds the first opening 23 through which the inverter device INV can be inserted, the second opening 25 may be a factor of a decrease in the rigidity of the surrounding wall portion 30. For example, when the first opening edge 23e that is the opening edge of the first opening 23 is deformed due to insufficient rigidity of the surrounding wall portion 30, the top cover 13 (cover member) disposed so as to cover the first opening 23 may be lifted from the first opening 23 to create a gap. According to the present embodiment, even when the second opening 25 is formed, the deformation of the first opening edge 23e can easily be suppressed because the second opening width Y2 of the second opening 25 is smaller than the first opening width Y1. Since the first connection terminal T1 and the second connection terminal T2 are juxtaposed along the up-down direction V, the power cable 7 connected to them is likely to have a width in the width direction H that is smaller than the width in the up-down direction V. Thus, the power cable 7 can appropriately be inserted even when the opening widths of the second opening 25 are set as described above.

As described above with reference to FIG. 2, the top cover 13 is fixed to the surrounding wall portion 30 by the plurality of fastening members 33 disposed away from each other along the first opening edge 23e that is the opening edge of the first opening 23. Among them, a pair of fastening members 33 (33a, 33b) is disposed on both sides across the second opening 25. Specifically, as shown in FIG. 2, a first fastening member 33a and a second fastening member 33b are disposed on both sides of the second opening 25 across the second opening 25. Since the top cover 13 is fixed by fastening to the surrounding wall portion 30 near the second opening 25, the deformation of the first opening edge 23e due to the second opening 25 can be suppressed easily, and the lift of the top cover 13 from the first opening edge 23e can also be suppressed appropriately.

In other words, the first opening width Y1 is smaller than a distance X between the pair of fastening members 33 disposed on both sides of the second opening 25 across the second opening 25 (distance X between the first fastening member 33a and the second fastening member 33b). Since the top cover 13 is appropriately fixed by fastening to the surrounding wall portion 30 by the pair of fastening members 33 across the second opening 25, the deformation of the first opening edge 23e due to the second opening 25 can be suppressed easily, and the lift of the top cover 13 from the first opening edge 23e can also be suppressed appropriately.

As a matter of course, the fastening member 33 may be disposed only on one side of the second opening 25 as long as the rigidity enough to suppress the deformation of the first opening edge 23e and the lift of the top cover 13 from the first opening edge 23e is secured.

It is preferable that the second opening 25 have an elliptical shape as shown in FIG. 1 and the like in the axial view. When the relationship between the first opening width Y1 and the second opening width Y2 is satisfied, the shape of the second opening 25 in the axial view may be a polygonal shape such as a rectangular, hexagonal, or octagonal shape. When the shape of the second opening 25 is the elliptical shape as in the present embodiment, there are no corners compared to the case of the polygonal shape. Therefore, the rigidity of the surrounding wall portion 30 around the second opening 25 can be secured easily. As a matter of course, the second opening 25 may have a polygonal shape when sufficient rigidity is secured for the surrounding wall portion 30. The "elliptical shape" in the present embodiment also includes a substantially elliptical shape such as an egg shape or an oblong shape like an athletics track.

In the present embodiment, as shown in FIGS. 2, 7, and the like, the first opening edge 23e that is the opening edge of the first opening 23 and a second opening edge 25e that is an opening edge of the second opening 25 overlap each other both in the axial view and in an up-down view along the up-down direction V. That is, in the present embodiment, the first opening 23 and the second opening 25 are formed close to each other, and the first opening edge 23e and the second opening edge 25e are disposed close to each other. In that case, the deformation of the first opening edge 23e is likely to occur. According to the present embodiment, the decrease in the rigidity of the first opening 23 is suppressed and the deformation of the first opening 23 and the lift of the top cover 13 are suppressed because of, for example, the relationship between the first opening width Y1 and the second opening width Y2, the shape of the second opening 25, and the disposition of the fastening members 33 as described above. In the present embodiment, the power connector 70 is fitted to the second opening 25 as described later. Therefore, the decrease in the rigidity of the first opening 23 is suppressed and the deformation of the first opening 23 and the lift of the top cover 13 are suppressed.

As a matter of course, it is preferable that the rigidity of the first opening 23 be secured by, for example, the relationship between the first opening width Y1 and the second opening width Y2, the shape of the second opening 25, the disposition of the fastening members 33, and the fitting of the power connector 70 to the second opening 25 as described above even when the first opening edge 23e and the second opening edge 25e overlap each other only in the up-down view or in the axial view or when the first opening edge 23e and the second opening edge 25e overlap each other neither in the up-down view nor in the axial view. In the present embodiment, the "opening edge" refers to a frame-shaped portion surrounding the opening. More specifically, the first opening edge 23e is a portion that is provided so as to surround the first opening 23 and forms a joint surface to which the top cover 13 (cover member) is joined. In the illustrated example, the first opening edge 23e includes a flange-shaped portion formed so as to protrude from the surrounding wall portion 30 toward the outside of the first opening 23. The second opening edge 25e is a frame-shaped portion that is provided so as to surround the second opening 25 and is formed so as to protrude in the axial direction L from the surrounding wall portion 30.

Figure 8:
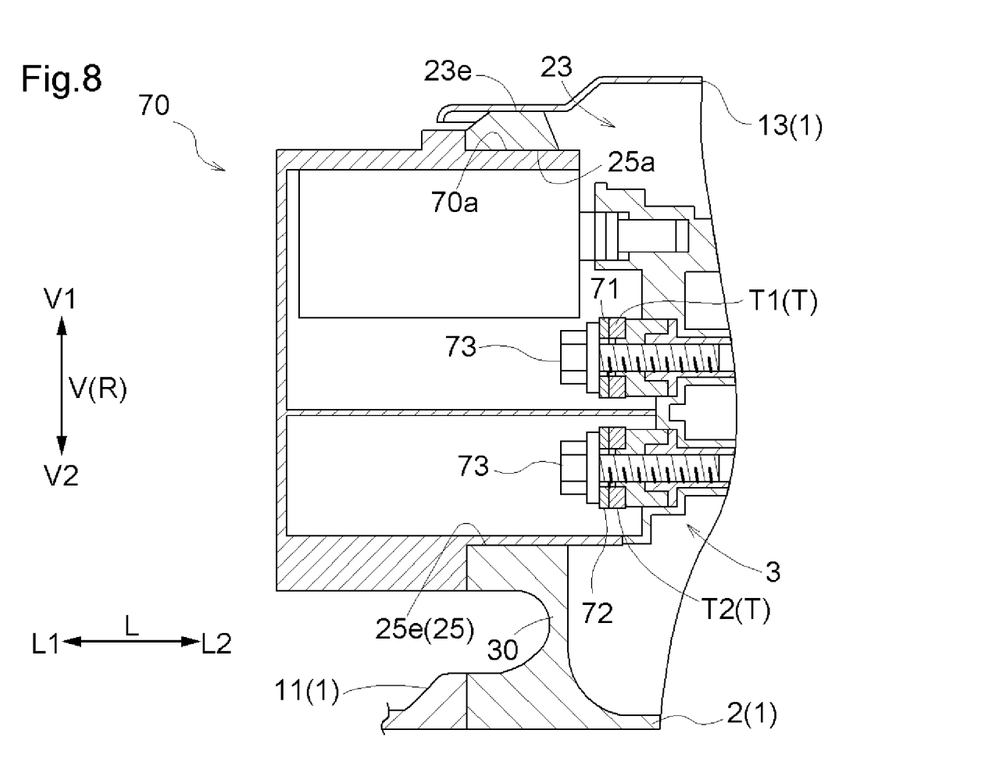
FIG. 8 is a partially enlarged axial sectional view of the vicinity of the power connection opening in the state in which the power cable is attached.

As described above, the high-voltage battery BH and the inverter device INV (inverter circuit 60) are electrically connected by connecting the power connection terminals T and the power terminals of the power connector 70. The power terminals (first power terminal 71 and second power terminal 72) of the power connector 70 are electrically connected to the power connection terminals T (first connection terminal T1 and second connection terminal T2) provided integrally with the direct-current busbars 55 (cathode busbar 54 and anode busbar 56) of the inverter device INV or electrically connected to the direct-current busbars 55. For example, as shown in FIG. 8, the first power terminal 71 and the first connection terminal T1 are fixed by fastening with the terminal connection member 73, and the second power terminal 72 and the second connection terminal T2 are fixed by fastening with the terminal connection member 73. The fastening member (screw) is exemplified as the terminal connection member 73, but a rivet or the like may be used.

Figure 6:
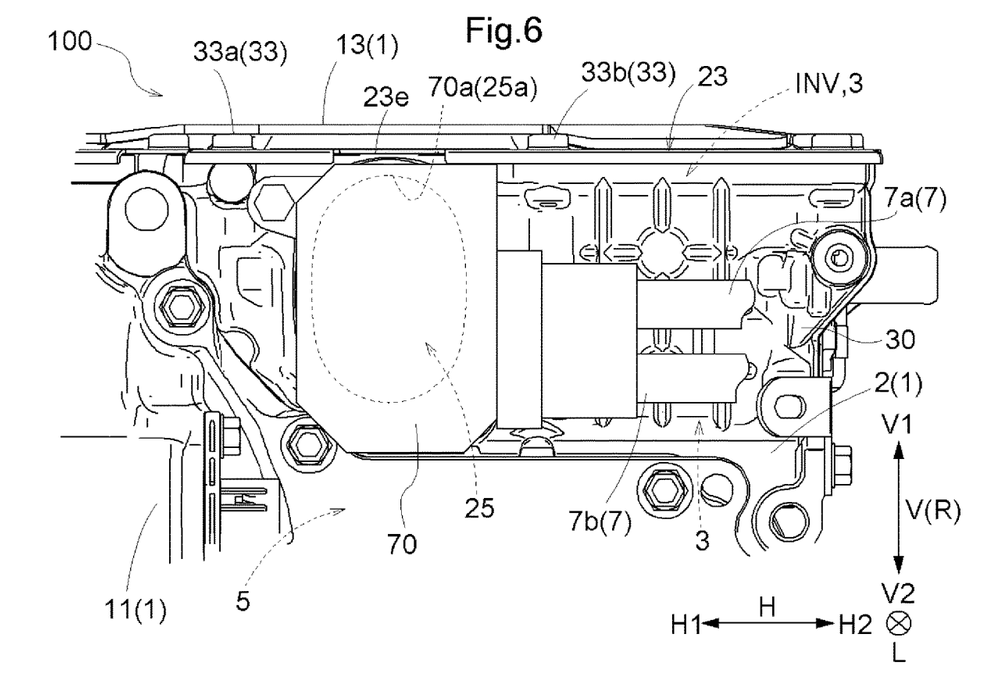
FIG. 6 is a partially enlarged side view of a case in a state in which a power cable is attached.

The power connector 70 is disposed at the tip of the power cable 7 (tip opposite to the side connected to the high-voltage battery BH). The power connector 70 is made of a hard resin, and includes conductors and power terminals inside. As shown in FIG. 6, the power connector 70 is attached to the case 1 so as to cover the second opening 25. At this time, as shown in FIG. 8, an outer peripheral surface 70a of the power connector 70 is fitted to an inner peripheral surface 25a of the second opening 25. By fitting the power connector 70 to the second opening 25, an effect of reinforcing the second opening 25 can be obtained, thereby easily suppressing the deformation of the second opening 25. Accordingly, the deformation of the first opening edge 23e can be suppressed easily.

Although detailed illustration is omitted, the power connector 70 may have a body and a lid. The structure may be such that the first power terminal 71 and the first connection terminal T1 are fastened and the second power terminal 72 and the second connection terminal T2 are fastened by the terminal connection members 73 with the lid unattached to the body, and then the cover is attached to the body.

In the present embodiment, the high-voltage battery BH has the high voltage of 200 to 400 volts. Further, the current consumption is as large as several amperes to several tens of amperes. Therefore, the power cable 7 is a relatively thick and heavy member. When the power cable 7 is attached to the case 1 by the power connector 70, the load of the power cable 7 is applied to the second opening 25. When vibration due to traveling of the vehicle or vibration along with drive of the vehicle drive device 100 occurs, an inertial force may act on the power cable 7 and a further load may be applied to the second opening 25. Therefore, it is preferable to consider not only the rigidity in the static state but also the rigidity in the dynamic state as the rigidity of each of the second opening 25 and the first opening 23. According to the present embodiment, the second opening width Y2 is smaller than the first opening width Y1. Therefore, the deformation of the second opening 25 can easily be suppressed and thus the deformation of the first opening 23 can easily be suppressed as well even when a force along the up-down direction V that is likely to cause vibration with a relatively high acceleration in the vehicle is applied to the second opening 25.

The present embodiment exemplifies the form in which the power connector 70 is made of the hard resin, but the power connector 70 may be made of a soft resin, or the second opening 25 may be closed by a sheet-shaped resin cover. In this case, the rigidity of the second opening 25 cannot be increased by fitting the power connector 70 to the second opening 25. Such a form may be adopted when the rigidity of the second opening 25 is sufficient.

Other Embodiments

Hereinafter, other embodiments will be described. The configuration of each embodiment described below is not limited to being applied alone, and can be applied in combination with the configurations of other embodiments as long as there is no contradiction.

(1) The above description exemplifies the form in which the second opening 25 is open in the axial direction L. That is, the above description exemplifies the case where the second direction is the axial direction L. However, the second direction may be a direction along the width direction H. Alternatively, the second direction may be a direction oblique to the axial direction L and the width direction H. The above description exemplifies the form in which the first opening 23 is open to the first up-down side V1. That is, the above description exemplifies the form in which the first direction is the direction along the up-down direction V. However, the first opening 23 may be open in a direction intersecting the up-down direction V, and may be open to, for example, the second widthwise side H2. The present embodiment exemplifies the form in which the height of the first housing chamber 5 in the up-down direction V varies depending on the position in the width direction H in the axial view. In a case where the height of the first housing chamber 5 in the up-down direction V is substantially constant and the second housing chamber 3 is disposed on the first up-down side V1 of the first housing chamber 5, the first opening 23 may be open to the first widthwise side H1. In this case, the first direction is the width direction H, and the second direction is the axial direction L or the up-down direction V. Similarly, the first opening 23 may be open in the axial direction L. In this case, the first direction is the axial direction L, and the second direction is the width direction H or the up-down direction V.

(2) The above description exemplifies the form in which the first housing chamber 5 and the second housing chamber 3 are separated from each other by the partition wall portion 4. The case body 2 need not include the partition wall portion 4 as long as the case body 2 is integrally formed so as to form the first housing chamber 5 and the second housing chamber 3.

(3) The above description exemplifies the vehicle drive device 100 including the rotary electric machine MG as the driving force source for the wheels W. The vehicle drive device 100 may be a hybrid drive device including both an engine and the rotary electric machine MG as the driving force source for the wheels W of the vehicle (e.g., various types of hybrid drive device such as a so-called one-motor parallel type and a so-called two-motor split type).

(4) The above description exemplifies the three-axis vehicle drive device 100 in which the three axes that are the first axis A1, the second axis A2, and the third axis A3 are parallel to each other. The vehicle drive device 100 may be a two-axis vehicle drive device in which two axes that are the first axis A1 and the second axis A2 are parallel to each other. The vehicle drive device 100 may further have one or more axes different from the first axis A1, the second axis A2, and the third axis A3, that is, may have four or more axes. In these cases, a part of the axes may extend along a direction(s) that is not parallel to those of the remainder of the axes.

Summary of Embodiment

Hereinafter, a brief summary of the vehicle drive device (100) described above will be provided.

As one aspect, a vehicle drive device (100) includes a rotary electric machine (MG), an inverter device (INV) that controls drive of the rotary electric machine (MG), and a case (1). The inverter device (INV) includes power connection terminals (T) connected to a direct current power source (BH). The case (1) includes a case body (2) and a cover member (13) joined to the case body (2). The case body (1) is integrally formed so as to form a first housing chamber (5) that houses the rotary electric machine (MG) and a second housing chamber (3) that houses the inverter device (INV). The case body (1) has a first opening (23) that is open from the second housing chamber (3) toward an outside of the case (1) along a predetermined first direction (V) and through which the inverter device (INV) is insertable. The case body (2) further has a surrounding wall portion (30) disposed along the first direction (V) so as to surround the first opening (23), and a second opening (25) that is formed in the surrounding wall portion (30) and through which a power cable (7) electrically connecting the direct current power source (BH) and the power connection terminals (T) is inserted. The cover member (13) is fixed to the surrounding wall portion (30) by a plurality of fastening members (33) disposed away from each other along an opening edge (23e) of the first opening (23) so as to cover the first opening (23). The power connection terminals (T) include a cathode connection terminal (T1 or T2) connected to a cathode of the direct current power source (BH), and an anode connection terminal (T2 or T1) connected to an anode of the direct current power source (BH). The cathode connection terminal (T1 or T2) and the anode connection terminal (T2 or T1) are juxtaposed along the first direction (V). Assuming that a second direction (L) is a direction in which the second opening (25) is open, in a second-direction (L) view along the second direction (L), a second opening width (Y2) that is an opening width of the second opening (25) in a direction (H) orthogonal to the first direction (V) is smaller than a first opening width (Y1) that is an opening width of the second opening (25) in the first direction (V), and a pair of the fastening members (33 (33a, 33b)) is disposed on both sides across the second opening (25).

When the second opening (25) through which the power cable (7) is inserted is formed in the surrounding wall portion (30) that surrounds the first opening (23) through which the inverter device (INV) can be inserted, the second opening (25) may be a factor of a decrease in the rigidity of the surrounding wall portion (30). For example, when the opening edge (23e) of the first opening (23) is deformed due to insufficient rigidity of the surrounding wall portion (30), the cover member (13) disposed so as to cover the first opening (23) may be lifted from the first opening (23) to create a gap. According to this configuration, even when the second opening (25) is formed, the deformation of the opening edge (23e) of the first opening (23) can easily be suppressed because the second opening width (Y2) of the second opening (25) is smaller than the first opening width (Y1). Since the cathode connection terminal (T1 or T2) and the anode connection terminal (T2 or T1) of the power connection terminals (T) are juxtaposed along the first direction (V), the power cable (7) connected to them is likely to have a width in the direction (H) orthogonal to the first direction (V) that is smaller than the width in the first direction (V). Thus, the power cable (7) can appropriately be inserted even when the opening widths of the second opening (25) are set as described above. Since the pair (33a, 33b) among the plurality of fastening members (33) disposed along the opening edge (23e) of the first opening (23) is disposed on both sides of the second opening (25) across the second opening (25), the cover member (13) is fixed by fastening to the surrounding wall portion (30) near the second opening (25). Therefore, the deformation of the opening edge (23e) of the first opening (23) due to the second opening (25) can be suppressed easily, and the lift of the cover member (13) from the opening edge (23e) of the first opening (23) can also be suppressed appropriately. As described above, according to this configuration, it is possible to provide the vehicle drive device (100) in which the power cable (7) can appropriately be connected while securing the rigidity of the case (1) that houses the inverter (INV) so as not to impair the closing performance of the case (1).

In the vehicle drive device (100), it is preferable that the first opening width (Y1) be smaller than a distance (X) between the pair of the fastening members (33 (33a, 33b)).

According to this configuration, the cover member (13) is appropriately fixed by fastening to the surrounding wall portion (30) by the pair of the fastening members (33 (33a, 33b)) across the second opening (25). Therefore, the deformation of the opening edge (23e) of the first opening (23) due to the second opening (25) can be suppressed easily, and the lift of the cover member (13) from the opening edge (23e) of the first opening (23) can also be suppressed appropriately.

In the vehicle drive device (100), it is preferable that the cover member (13) have a flat plate portion.

When the cover member (13) has the flat plate portion, the opening edge (23e) of the first opening (23) and the cover member (13) are easily brought into contact with each other and fastened by the fastening members (33). If the rigidity of the second opening (25) is low in this case, the first opening (23) is easily deformed, and the cover member (13) may be lifted from the opening edge (23e) of the first opening (23). Since the deformation of the second opening (25) is suppressed, the lift of the cover member (13) can be suppressed appropriately while providing a structure in which the opening edge (23e) of the first opening (23) and the cover member (13) can be fastened easily.

In the vehicle drive device (100), it is preferable that the second opening (25) have an elliptical shape in the second-direction (L) view.

When the relationship between the first opening width (Y1) and the second opening width (Y2) is satisfied, the shape of the second opening (25) in the second-direction (L) view may be a polygonal shape such as a rectangular, hexagonal, or octagonal shape. When the shape of the second opening (25) is the elliptical shape as in this configuration, there are no corners compared to the case of the polygonal shape. Therefore, the rigidity of the surrounding wall portion (30) around the second opening (25) can be secured easily. The "elliptical shape" also includes a substantially elliptical shape such as an egg shape or an oblong shape like an athletics track.

In the vehicle drive device (100), it is preferable that an outer peripheral surface (70a) of a connector (70) of the power cable (7) be fitted to an inner peripheral surface (25a) of the second opening (25).

In general, the connector (70) of the power cable (7) is made of a hard resin, and includes conductors and terminals inside. By fitting the connector (70) to the second opening (25), an effect of reinforcing the second opening (25) can be obtained, thereby easily suppressing the deformation of the second opening (25). Accordingly, the deformation of the opening edge (23e) of the first opening 23 can be suppressed easily.

In the vehicle drive device (100), it is preferable that a first opening edge (23e) that is the opening edge of the first opening (23) and a second opening edge (25e) that is an opening edge of the second opening (25) overlap each other both in a first-direction (V) view along the first direction (V) and in the second-direction (L) view.

According to this configuration, the first opening (23) and the second opening (25) are formed close to each other, and the first opening edge (23e) and the second opening edge (25e) are disposed close to each other. In that case, the deformation of the first opening edge (23e) is likely to occur. Various aspects of the vehicle drive device (100) described above are useful in such a configuration. That is, the decrease in the rigidity of the first opening (23) is suppressed and the deformation of the first opening (23) and the lift of the cover member (13) are suppressed because of, for example, the relationship between the first opening width (Y1) and the second opening width (Y2), the shape of the second opening (25), and the disposition of the fastening members (33) as described above. When the power connector (70) is fitted to the second opening (25), the decrease in the rigidity of the first opening (23) is suppressed and the deformation of the first opening (23) and the lift of the top cover (13) are suppressed.

DESCRIPTION OF THE REFERENCE NUMERALS

1: case, 2: case body, 3: second housing chamber, 5: first housing chamber, 7: power cable, 13: top cover (cover member), 23: first opening, 23e: first opening edge, 25: second opening, 25a: inner peripheral surface, 25e: second opening edge, 30: surrounding wall portion, 33: fastening member, 33a, 33b: pair of fastening members, 70: power connector (connector of power cable), 70a: outer peripheral surface, 100: vehicle drive device, BH: high-voltage battery (direct current power source), H: width direction (direction orthogonal to first direction at second opening), INV: inverter device, L: axial direction (second direction), MG: rotary electric machine, T: power connection terminal, T1: first connection terminal (anode connection terminal or cathode connection terminal), T2: second connection terminal (cathode connection terminal or anode connection terminal), V: up-down direction (first direction), X: distance between pair of fastening members, Y1: first opening width, Y2: second opening width

The invention claimed is:

1. A vehicle drive device comprising:
a rotary electric machine;
an inverter device that controls drive of the rotary electric machine; and
a case, wherein
the inverter device includes power connection terminals connected to a direct current power source,
the case includes a case body and a cover member joined to the case body,
the case body is integrally formed so as to form a first housing chamber that houses the rotary electric machine and a second housing chamber that houses the inverter device,
the case body has a first opening that is open from the second housing chamber toward an outside of the case along a predetermined first direction and through which the inverter device is insertable,
the case body further has a surrounding wall portion disposed along the first direction so as to surround the first opening, and a second opening that is formed in the surrounding wall portion and through which a power cable electrically connecting the direct current power source and the power connection terminals is inserted,
the cover member is fixed to the surrounding wall portion by a plurality of fastening members disposed away from each other along an opening edge of the first opening so as to cover the first opening,
the power connection terminals include a cathode connection terminal connected to a cathode of the direct current power source, and an anode connection terminal connected to an anode of the direct current power source,
the cathode connection terminal and the anode connection terminal are juxtaposed along the first direction, and
assuming that a second direction is a direction in which the second opening is open,
in a second-direction view along the second direction, a second opening width that is an opening width of the second opening in a direction orthogonal to the first direction is smaller than a first opening width that is an opening width of the second opening in the first direction,
a pair of the fastening members is disposed on both sides across the second opening,
a first opening edge that is the opening edge of the first opening and a second opening edge that is an opening edge of the second opening overlap each other both in a first-direction view along the first direction and in the second-direction view, and the first opening edge and the second opening edge are frame-shaped portions that surround the first opening and the second opening.

2. The vehicle drive device according to claim 1, wherein the first opening width is smaller than a distance between the pair of the fastening members.

3. The vehicle drive device according to claim 1, wherein the cover member has a flat plate portion.

4. The vehicle drive device according to claim 1, wherein the second opening has an elliptical shape in the second-direction view.

5. The vehicle drive device according to claim 1, wherein an outer peripheral surface of a connector of the power cable is fitted to an inner peripheral surface of the second opening.

6. The vehicle drive device according to claim 1, wherein:

the frame-shaped portion of the first opening edge is formed so as to protrude from the surrounding wall portion toward an outside of the first opening, and the frame-shaped portion of the second opening edge is provided so as to surround the second opening and is formed so as to protrude in an axial direction from the surrounding wall portion.

7. The vehicle drive device according to claim 1, wherein:

the first opening edge is provided so as to surround the first opening and form a joint surface to which the cover member is joined, and the frame-shaped portion of the second opening edge is provided so as to surround the second opening and is formed so as to protrude from the surrounding wall portion.

* * * * *